United States Patent [19]
Mikulic

[11] Patent Number: 5,097,166

[45] Date of Patent: Mar. 17, 1992

[54] ROTOR LAMINATION FOR AN AC PERMANENT MAGNET SYNCHRONOUS MOTOR

[75] Inventor: Kreso Mikulic, Cincinnati, Ohio

[73] Assignee: Reuland Electric, Cincinnati, Ohio

[21] Appl. No.: 586,863

[22] Filed: Sep. 24, 1990

[51] Int. Cl.[5] .................................................. H02K 21/12
[52] U.S. Cl. ...................................... 310/156; 310/261; 310/211
[58] Field of Search ............... 310/156, 261, 162, 163, 310/166, 201, 216, 264, 211, 265, 269

[56] References Cited

U.S. PATENT DOCUMENTS

| | | | |
|---|---|---|---|
| 4,139,790 | 2/1979 | Steen | 310/156 |
| 4,358,692 | 2/1979 | Liu et al. | 310/156 |
| 4,358,697 | 11/1982 | Liu et al. | 310/156 |
| 4,469,970 | 9/1984 | Neumann | 310/156 |
| 4,568,846 | 2/1986 | Kapadia | 310/156 |
| 4,748,360 | 5/1988 | Kawada et al. | 310/156 |
| 4,922,152 | 5/1990 | Gleghorn et al. | 310/156 |

Primary Examiner—Steven L. Stephan
Assistant Examiner—Matthew Nguyen
Attorney, Agent, or Firm—Irell & Manella

[57] ABSTRACT

A high-speed rotor for an AC permanent magnet synchronous motor includes a stack of magnetically permeable rotor laminations. Each rotor lamination comprises a plurality of conductive bar slots for holding a starter winding and having openings facing outside for minimizing the flux leakage from the rotation magnetic field produced by primary windings on the stator, and magnet slots for holding permanent magnets to produce an even number of magnetic poles on the periphery of the rotor. The lamination further includes a plurality of flux barrier slots connected to the magnet slots for minimizing the flux leakage from the permanent magnets and forming bridges in a ring configuration between the conductive bar slots and the barrier slots so that the integrality of the lamination is very much enhanced, while the power loss is minimized.

19 Claims, 4 Drawing Sheets

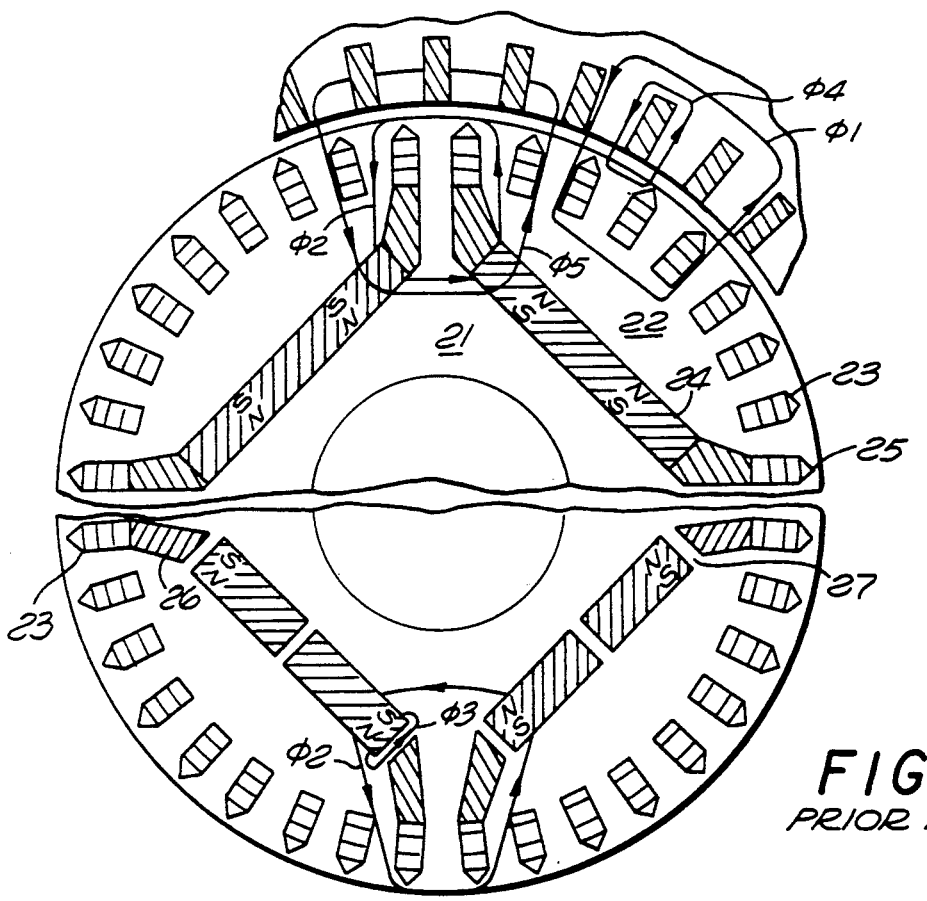
FIG. IA
PRIOR ART
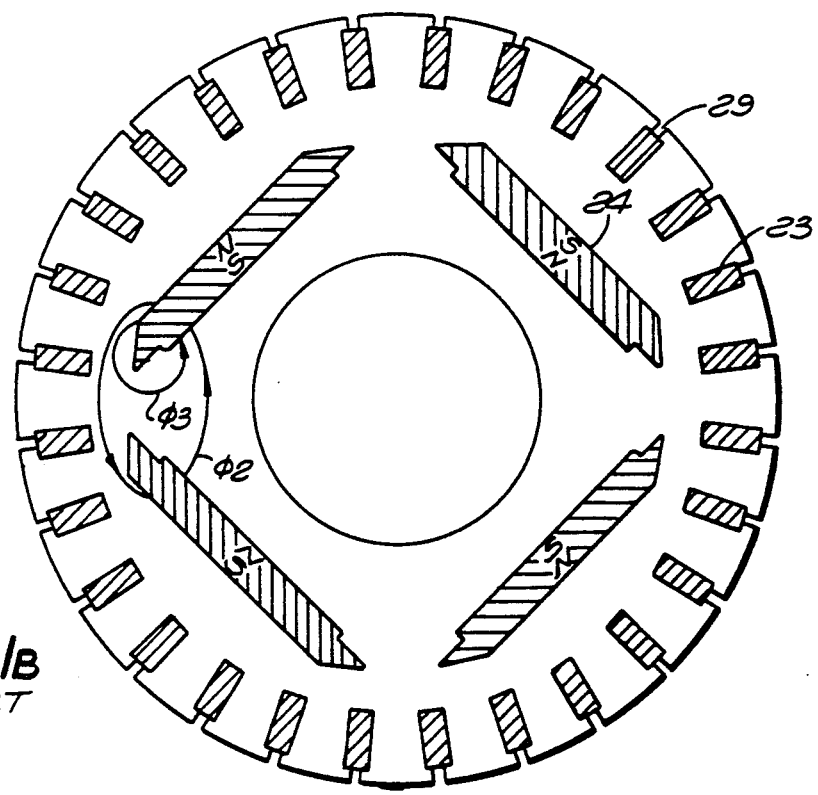
FIG. IB
PRIOR ART

ROTOR LAMINATION FOR AN AC PERMANENT MAGNET SYNCHRONOUS MOTOR

FIELD OF THE INVENTION

The present invention relates to an improvement of a rotor for an AC permanent magnet synchronous motor, and particularly to rotor laminations for such AC permanent magnet synchronous motors which operate at high speeds.

BACKGROUND OF THE INVENTION

AC permanent magnet synchronous motors are an important type of AC synchronous machines which can operate at predetermined constant speeds for producing mechanical actuation, and such motors have been widely used in a variety of industry environments. The conventional AC permanent magnet synchronous motors are normally constructed with a stator having a primary winding for generating a rotating magnetic field to provide rotation torque under energization of AC power. The AC permanent magnet motor also includes a rotor having a central shaft and a stack of laminations mounted on the shaft which hold a plurality of conductive bars (i.e., squirrel cage bars) for starting the rotation of the rotor and a plurality of permanent magnets for producing an even number of magnetic poles on the periphery of the rotor to lock the rotor at particular synchronous speeds.

Three important considerations for any motor are power factor, efficiency and maximum speed limit. A spinning rotor undergoes centrifugal forces which tend to force the rotating rotor away from its axis. This force becomes bigger with an increase of rotor speed so that the maximum speed of a rotor is limited. Therefore, strength is a very important parameter to high speed motors. In addition, the magnetic field created by the permanent magnets secured by the rotor laminations and the rotating magnetic field produced by the primary winding on the stator characteristically have flux leakage through the laminations. As a result, the power factor, efficiency and other parameters, such as pull in and pull out torques of the motor are very much affected. These parameters are also very important to a high speed motor. Over the years, various rotor laminations have been designed to achieve a high strength for resisting centrifugal forces and at the same time for reducing the flux leakage for enhancing the motor's power factor, efficiency and maximum speed limit.

A typical example of such a rotor lamination is shown in FIG. 1A, which is disclosed by U.S. Pat. No. 4,139,790 issued on Feb. 13, 1979 to Charles R. Steen. The rotor lamination illustrated by the upper part of FIG. 1A has an inner portion 21 and an outer portion 22 connected by bridges 25 between conductive bar slots 23 and the periphery of the rotor lamination. The rotation magnetic field $\phi1$ is created by the stator primary windings for providing a basis rotation torque. The magnetic flux $[\phi5]$ is generated by the permanent magnets 24 for synchronous operation. The bridges 25 are normally very narrow in order to achieve a high power factor and efficiency. If the bridges 25 are widened, the leakage flux $[\phi2]$ from the permanent magnets, and particularly, the leakage flux $\phi4$ from the stator windings will consequently increase to result in more power loss. Because, the interconnections between the two portions 21 and 22 of the lamination are very weak, the maximum speed is limited. In order to obtain high strength for the rotor without increasing the width of the bridges, non-magnetic laminations are utilized between the magnetically permeable laminations. This structure requires the use of more expensive material such as stainless steel which increases the rotor's longitudinal dimension. On the other hand, since non-magnetic laminations extend from the shaft to the outside of the rotor, flux leakage occurs along the entire magnetic width of each non-magnetic lamination. A modification to magnetically permeable laminations which serves to strengthen the rotor lamination is to provide bridges 27 at the end of each permanent magnet and bridges 28 as shown in FIG. 1A. However, such bridges 27 will make the manufacture of the lamination very difficult. For example, since the relative position of each permanent magnet 24 to a flux leakage barrier 26, connected to a bar slot 23, is fixed and must be very accurate in order to obtain a narrow bridges 27, it is hard to stamp the permanent magnet slots by using simple tools. Further, the bridges 27 will be easily broken during installation of the permanent magnets 24 into the magnet slots. Furthermore, such bridges 27 enable more flux leakage ($\phi3$) from permanent magnets to occur which will affect the uniformity of the magnetic field and flux density of the field.

Other examples of prior rotors and rotor laminations are disclosed in U.S. Pat. No. 4,358,697 issued on Nov. 9, 1982 to Joseph C. Liu, et al., U.S. Pat. No. 4,358,696 issued on Nov. 9, 1982 to Joseph C. Liu et al., U.S. Pat. No. 4,469,970, issued on Sept. 4, 1984 to Thomas W. Neumann, U.S. Pat. No. 4,476,408 issued on Oct. 9, 1984 to Vernon B. Honsinger, U.S. Pat. No. 4,525,925 issued on July 2, 1985 to Donald W. Jones and U.S. Pat. No. 4,568,846 issued on Feb. 4, 1986 to Shailesh C. Kapedia.

The rotors and rotor limitations disclosed in the above patents either arrange magnets in complicated patterns or use special strength laminations or special strengthening material in the laminations. These approaches make the rotor laminations more difficult to manufacture and more expensive. Additionally, all of the prior art rotor laminations have flux leakage ($\phi4$) from the rotating magnetic field which passes through the bridges between the conductive bar slots and the periphery of the rotor lamination, as shown (for example) in the upper portion of FIG. 1A.

FIG. 1B depicts a rotor lamination manufactured by Reuland Electric Inc. The rotor lamination utilizes openings 29 between the conductive bar slots 23 and the periphery of the rotor lamination for eliminating flux leakage ($\phi4$) as shown in FIG. 1A. However, this product has a large amount of flux leakage ($\phi2$) and ($\phi3$).

The present invention overcomes the shortcomings of such prior art rotor laminations and provides an economically manufacturable rotor lamination for an AC permanent magnet synchronous motor.

OBJECT OF THE INVENTION

It is an object of the present invention to provide an improved AC permanent magnet synchronous motor which operate at high speeds while maintaining a high power factor and high efficiency.

It is another object of the present invention to provide an AC permanent magnet synchronous motor which has an even number of magnetic poles, such as two poles, four poles or six poles, with high strength and low flux leakage.

It is another object of the present invention to provide a rotor lamination for an AC permanent magnet synchronous motor which has high strength and which does not require special strengthening materials or special strengthening laminations.

It is still another object of the present invention to provide a rotor lamination which can minimize the leakage flux from both stator primary windings and permanent magnets so as to ensure high power, high efficiency and high pull-in and pull-out torques while improving the strength of the rotor.

It is a further object of the present invention to provide a high efficiency and high-speed rotor for an AC permanent magnet synchronous motor which is easily manufacturable at a low cost.

These and still further objects of the present invention will become apparent hereinafter.

BRIEF SUMMARY OF THE INVENTION

The present invention relates to an improved AC permanent magnet synchronous motor which can run at high power factor, high efficiency and high synchronous speed. The motor comprises a stator with a plurality of primary windings excited by an alternating power supply for producing a rotating magnetic field to provide rotation torque. The motor also comprises a rotor having a stack of unitary rotor laminations mounted on a rotatable central shaft for axially holding a plurality of conductive bars (squirrel cage bars) to provide an induced-current loop for accelerating the rotor to synchronous speeds. A plurality of permanent magnets are also contained in the motor for creating an even number of magnetic poles on the periphery of the rotor to lock the rotor at synchronous speeds. In one embodiment of the invention, the rotor lamination includes a plurality of squirrel cage bar slots spaced apart and around the peripheral area of the lamination for securing a conductive bar therein. Each conductive bar has an opening facing an air gap between the periphery of the lamination and the inner surface of the stator for minimizing flux leakage of the rotating magnetic field produced by the primary windings of the stator. The rotor lamination further includes a plurality of permanent magnet slots which substantially divide the lamination into an inner portion and an outer portion, and a plurality of flux barrier slots.

Each flux barrier slot is connected to a permanent magnet slot and has one side toward the inner end of the squirrel cage bar to form a bridge between the inner portion and the outer portion of the lamination for strengthening the lamination. The bridges are narrow enough to cause magnetic saturation by the magnetic flux from the permanent magnets. Each of the bridges is substantially perpendicular to a radial line so as to form a ring configuration. Under this configuration, the positions of the barrier slots and magnet slots may be rotated or displaced during manufacture with respect to the central axis, without affecting the design requirements and thereby making manufacture of the termination much easier than the conventional technique. In the case of a two-pole rotor, the flux barrier slots are in a triangular shape. In four poles and six poles rotors, the rotor has the flux barrier slots extending toward the outside from the magnet slots to form bridges in cooperation with the conductive bar slots. With the combination of such bridges and openings on the squirrel cage bar slots, the rotor lamination achieves high strength and low power loss, which is particularly suitable for use in high speed motors.

BRIEF DESCRIPTION OF THE DRAWINGS

FIG. 1A shows two types of prior art rotor laminations, and FIG. 1B shows another type of prior art rotor lamination.

DETAILED DESCRIPTION OF THE INVENTION

Figure 2:
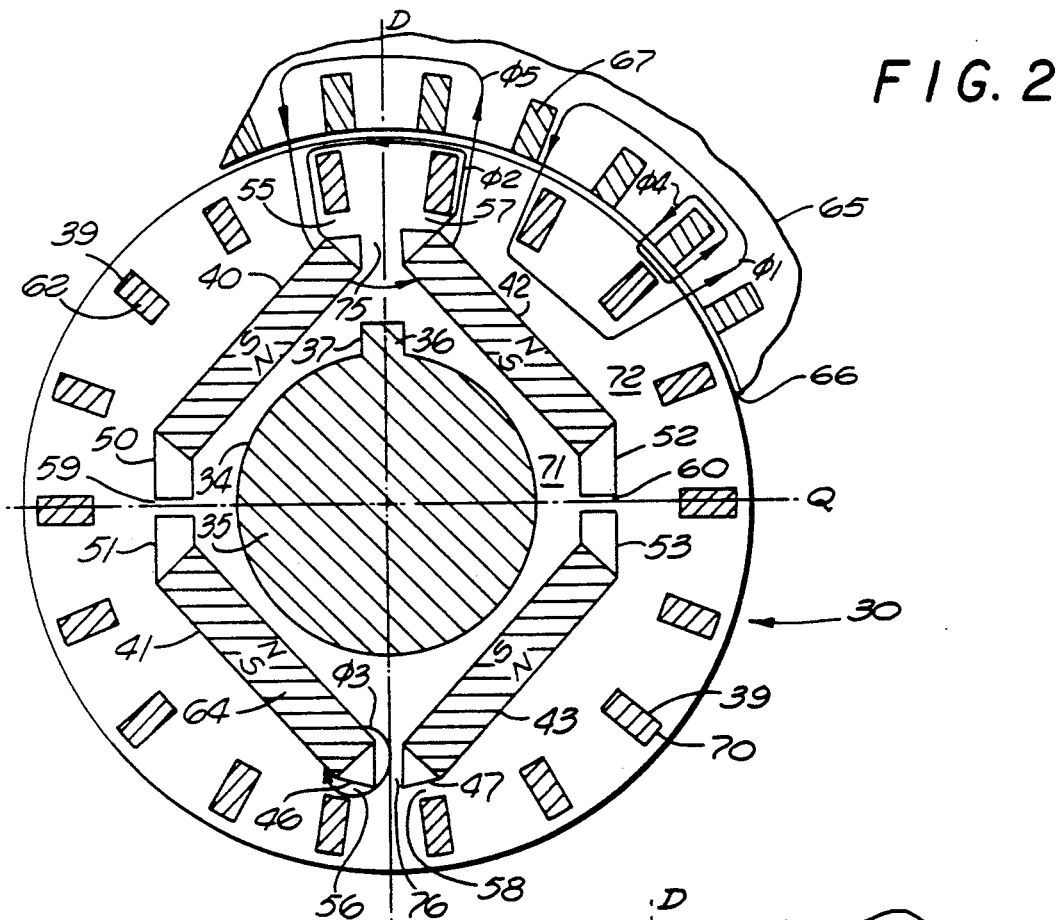
FIG. 2 is a plan view of an embodiment of a two-pole rotor lamination of the present invention.

Referring to the drawings in FIG. 2, a rotor lamination 30 is shown for a two-pole permanent magnet synchronous motor, which is an unitary thin circular disc made of highly magnetically permeable material such as silicon steel or the like, which can operate at very high speeds. The rotor lamination 30 includes a central shaft aperture 34 with a locking portion 37, a plurality of squirrel cage bar slots 39 (i.e., conductive bar slots 39), four permanent magnet slots 40-43, a plurality of flux barrier slots 45-48 and 50-53, and a plurality of bridges 55-60. A rotor of the present invention is constructed by a stack of such magnetically permeable rotor laminations 30 positioned in a face-to-face relationship to each other so that the conductive bars 62 and permanent magnets 64 can be axially secured in their corresponding aperture or slots 39-43. All of the rotor laminations are fixed on the central rotor shaft 35 by a longitudinal locking tab 36 integrally formed on the shaft 35 which is complementary in shape with the locking portion 37 on the laminations 30 so that the rotor shaft 35 and the rotor laminations 30 can rotate together during operation. An air gap 66 exists between the rotor lamination 30 and the stator 65. The motor starts its rotation by the torque produced by the rotating magnetic field $\phi 1$ from the stator primary windings 67 applied on the induced current in the conductive bar windings, and then accelerates to a synchronous speed due to the "locking function" of the magnetic poles of the magnetic field $\phi 5$ on the periphery of the rotor laminations 30 created by the permanent magnets 64.

The squirrel cage bar or conductive bar slots 39 are spaced apart along the periphery of the lamination 30 in a uniform pattern. Each bar slot 39 has an outer end leaving a bridge 70 between the bar slot 39 and the periphery of the lamination 30. The bar slot 39 is filled with an individual conductor bar such as a copper bar or by a conductive casting material such as aluminium. The conductive bars or materials in the bar slots are connected to a conductive ring (not shown) so that the conductive bar (or starter winding) can establish an induced current which is induced by the rotating magnetic field from the stator winding 67 to accelerate the rotor.

The four magnet slots 40-43 are configured in the manner of two pairs (40, 41) and (42, 43), which are symmetrically distributed about a diametrical line D, substantially dividing the rotor lamination 30 into an inner portion 71 and an outer portion 72. Each pair of magnet slots (40, 41) or (42, 43) holds two magnets having magnetized north and south poles. The magnets are arranged so that the magnetic field or magnetic flux loop ($\phi 5$) is established to provide two magnetic poles on the periphery of the rotor. Each magnet slot 40–43 is preferably rectangular in shape and disposed at an angle of about 45 degrees with respect to the diametrical line D so that the construction of the rotor is relatively simplified. It should also be noted that the two pairs of magnet slots (40, 41) and (42, 43) preferably have ends very close to the conductive bar slots 39 adjacent to the diametrical line D. This configuration makes the flux pass shorter and the flux density higher on the stator winding.

Four triangular-shaped flux barrier slots 45–48 are provided for minimizing the type of leakage flux ($\phi 3$) of the permanent magnets as shown in FIG. 1B. Of course, the flux barrier slots do not have to be triangular in shape.

Each triangular flux barrier slot 45–48 adjacent to a magnet slot 40–43 defines a rib 75 or 76 across the diametrical line D in cooperation with an opposite barrier slot and forms, with the inner end of a squirrel cage bar slot 39, a narrow bridge 55–58 which is disposed substantially perpendicular to a radial line and provides an interconnection between the inner portion 71 and the outer portion 72 to strengthen the rotor lamination 30. The bridges 55–58 are narrow enough to allow them to be magnetically saturated by the flux leakage from the magnets. A conductive material such as aluminium can be used to fill in the flux barrier slots 45–48 or, alternatively, nothing at all. Under this arrangement, the bridges 70 between the squirrel cage bar slots 39 and the periphery of the rotor lamination can be made very narrow to minimize the flux leakage ($\phi 4$) from rotation magnetic field and the flux leakage from the permanent magnets is minimized while the lamination is strengthened. Further, the magnetic flux ($\phi 5$) on the periphery of the lamination or on the stator winding is more uniform and the flux density is higher due to restriction of the flux leakage $\phi 2$ and $\phi 3$. The integrality of the lamination 30 is enhanced by the bridges 55–58 which allow the rotor to operate at high speeds without being destroyed by centrifugal forces.

According to the present invention, since the bridges 55–58 are formed in a ring configuration between the cage bar slots 39 and the flux barrier slots 45–48, positions of the barrier slots 45–48 and the permanent magnet slots 40–43 with respect to the central axis are not fixed. In other words, the positions of the barrier slots 45–48 and the magnet slots 40–43 are not strict relative to the cage bar slots and may be rotated or displaced with respect to the central axis during manufacture. This makes manufacture easier, and more cost effective without affecting the ultimate design parameters.

In addition, due to the buffering function of the flux leakage barrier slots 45–48 disposed between the permanent magnet slots 40–43 and the bridges or rings 55–58, the bridges 55–58 will not be broken while installation of the permanent magnets into their slots during manufacture.

For very high speed rotors, two additional bridges 59 and 60 can be formed by four additional flux barrier slots 50–53 to further strengthen the lamination 30. The barrier slots 50–53 are respectively connected to one of the magnet slots 40, 41 or 42, 43, and they extend toward one another to form a narrow bridge 59 or 60 across a quadrature line Q. The bridges 59 and 60 are narrow enough to cause magnetic saturation.

Figure 3:
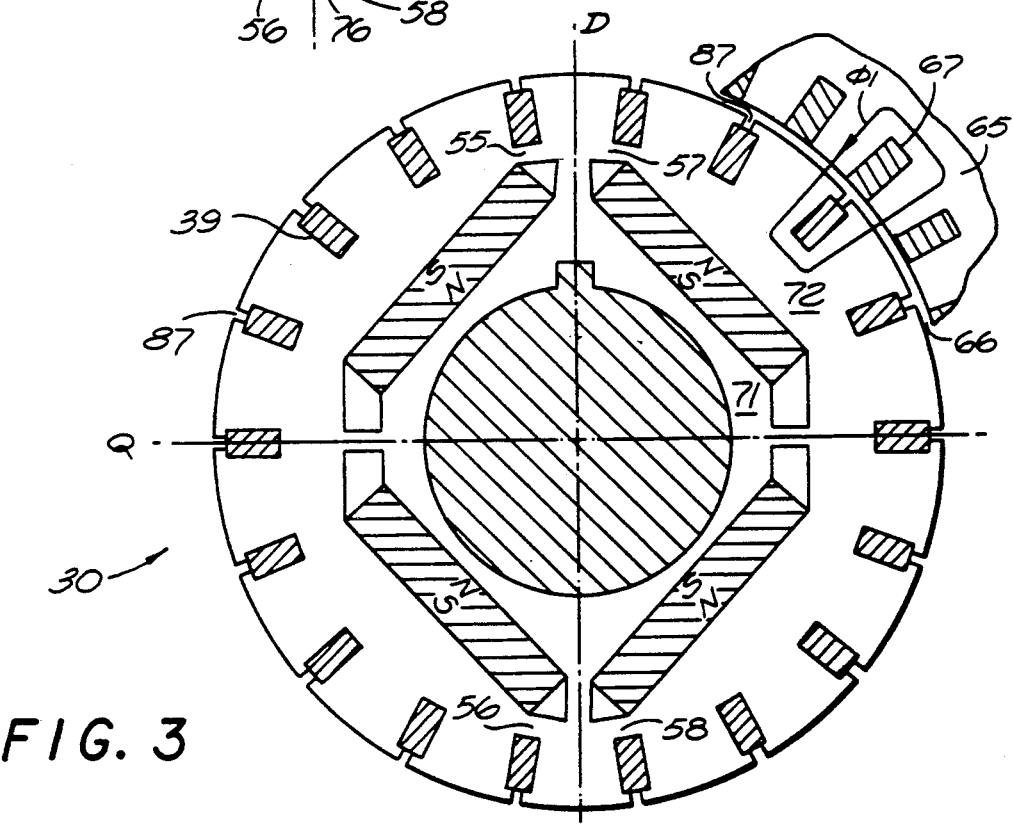
FIG. 3 is a plan view of a preferred embodiment of a two-pole rotor lamination of the present invention.

In another preferred embodiment of a two-pole rotor lamination 30 as shown in FIG. 3, each squirrel cage bar slot 39 has an opening 87 toward the air gap 66. The leakage flux ($\phi 4$) as shown in FIG. 2 from the stator winding 67 is eliminated in this embodiment. The combination of the bridges 55–60 with the openings 87 on the cage bar slots 39 constitutes one of the important features of the rotor lamination according to the present invention, which not only strengthens the rotor lamination and reduces the power loss so as to provide a reliable and high efficiency rotor or rotor lamination which can run at high speeds, but also make the manufacture of a rotor lamination much flexible and easier.

Figure 4:
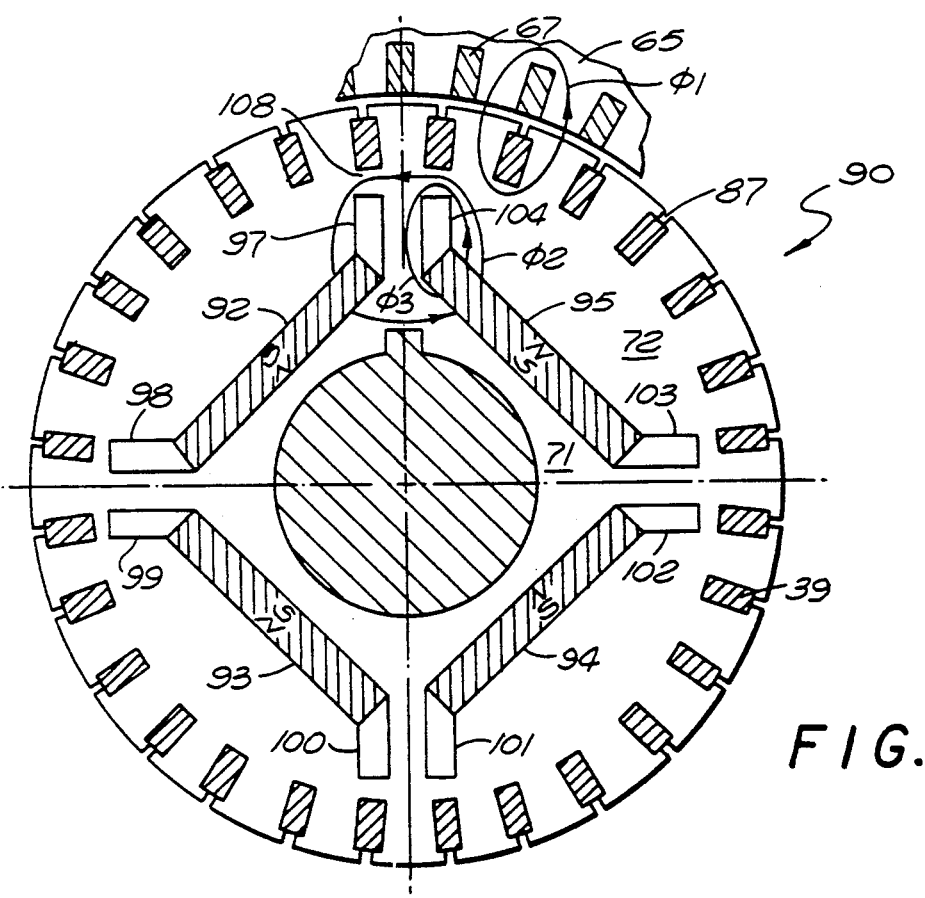
FIG. 4 is a plan view of a preferred embodiment of a four pole rotor lamination of the present invention.
Figure 5:
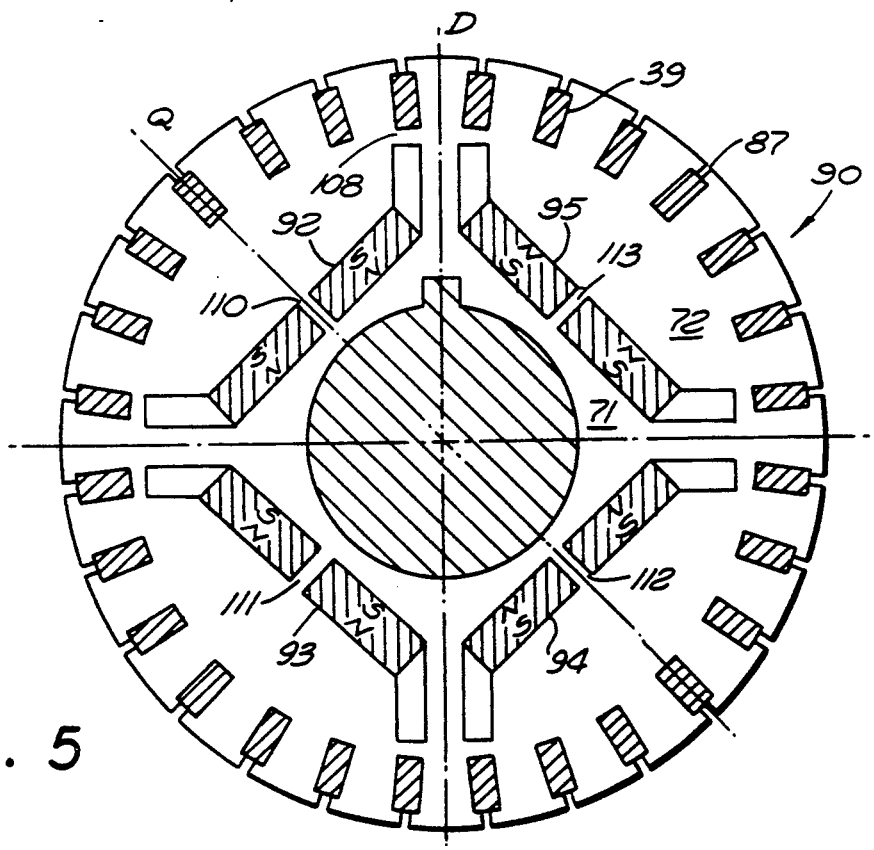
FIG. 5 is a plan view of another preferred embodiment of a four-pole rotor lamination of the present invention.

FIG. 4 shows a four-pole rotor lamination 90 which includes four magnet slots 92–95 positioned at ninety degrees (90°) of one another. The opposite magnets in magnet slots 92 and 94 have the same north and south magnetic pole configuration which is different from magnets 93 and 95. The magnets form four magnetic poles on the periphery of the lamination 90 at a quadrature relationship to each other. Each magnet slot 92–95 is connected to a trapizoidal flux barrier slot 97–104 and the trapizoidal flux barrier slot 97–104 extend outwardly toward the squirrel cage bar slot 39 to form bridges 108. In this case, flux leakage ($\phi 2$) and ($\phi 3$) is very much restrained. The bridges 108 are disposed substantially perpendicular to radial lines to form a discontinuous ring configuration. Each squirrel cage bar slot 39 can have an opening 87 facing outside to eliminate the power loss from stator windings and the bridges 108 will function as interconnections between the inner portion 71 and the outer portion 72 to strengthen the lamination. In this structure, the power factor and efficiency of the motor are enhanced. As for laminations which rotate at very high speeds as shown in FIG. 5, bridges 110–113 at the middle of each magnet slot 92–95 provide for further strengthening of the rotor lamination. The bridges 108 (as discussed above in a two-pole rotor lamination) can enhance the rotor strength and minimize the flux leakage from the permanent magnets while the flux leakage from the stator windings is minimized by the openings 87.

Figure 6:
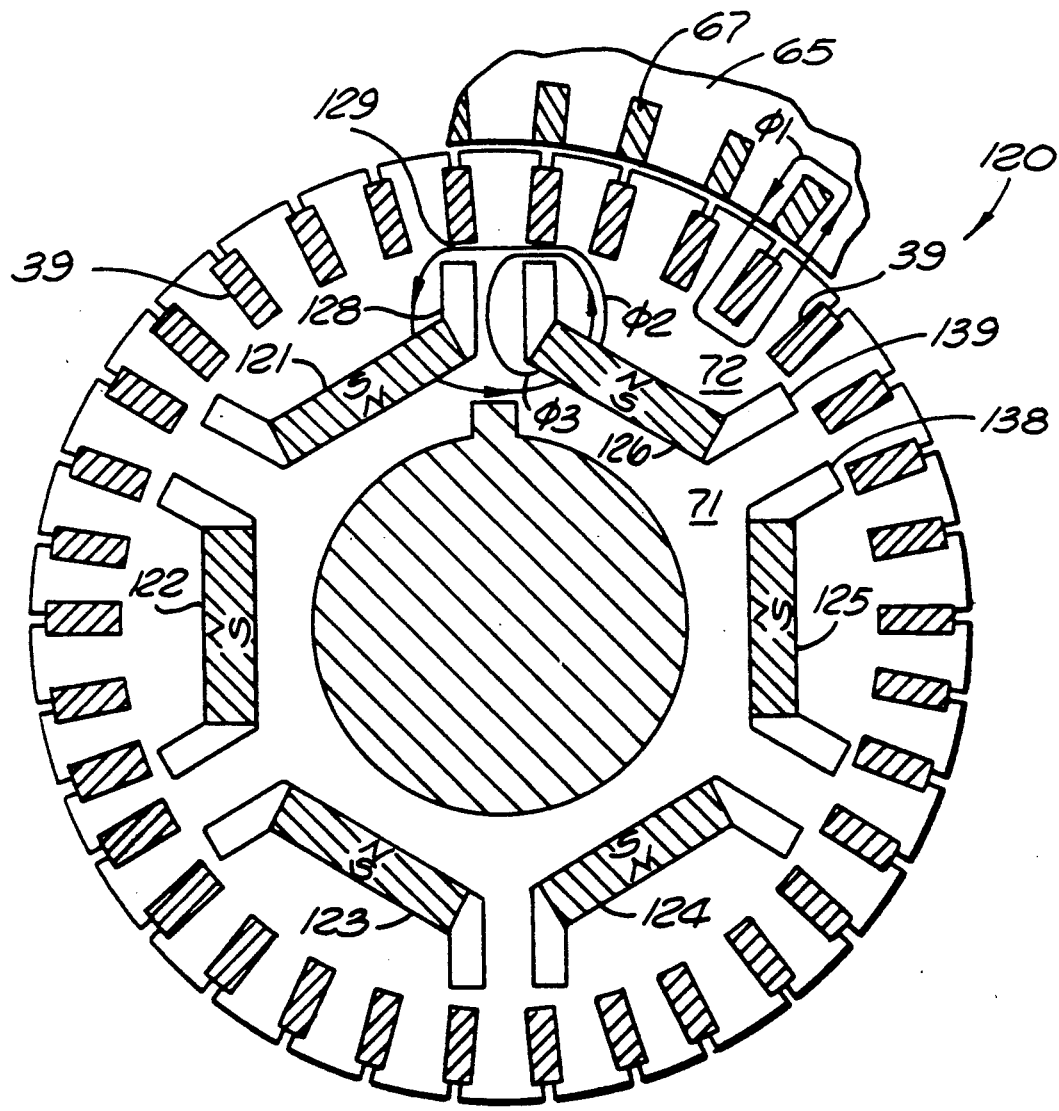
FIG. 6 is a plan view of a preferred embodiment of a six-pole rotor lamination of the present invention.

A six-pole rotor lamination 120 is shown in FIG. 6 which includes six magnet slots 121–126. Each magnet in the magnet slots 121–126 has a different magnetic pole configuration than its adjacent magnet so that the six magnetic poles of the magnets are provided on the periphery of the lamination 120. Each end of the magnet slots 121–126 are connected to a flux barrier slot 128 extending outwardly to form a bridge 129 between the inner portion 71 and the outer portion 72 of the lamination 60. Due to the configuration of the flux barrier slot 128, the flux leakage ($\phi 2$) and ($\phi 3$) is very much limited.

In the preferred embodiment, the flux barrier slots 128 are not necessary symmetrically disposed with respect to the squirrel cage bar slots 39. For example, as shown in FIG. 6, flux barrier slot 139 is located next to two squirrel cage bar slots 39 and flux barrier slot 138 is located next to only one squirrel cage slot 39. This arrangement provides a stronger connection between the inner and outer portions 71 and 72 of the lamination and allows manufacture of the rotor lamination more flexible and easier without increasing the flux leakage from the stator windings.

It should be noted that in the embodiments of the present invention the number of squirrel cage bar slots 39 in the rotor lamination can be eighteen slots, twenty-eight slots, thirty-four slots and forty-eight slots, etc. depending on the size of the lamination, torque required and other power and efficiency factors.

While the preferred application of the present invention has been shown and described, it should be apparent to those skilled in the art that many more modifications are possible without departing from the inventive concept described above and claimed below.

What is claimed is:

1. A rotor for an AC permanent magnet synchronous motor having a stator with a primary winding for producing a rotating magnetic field comprising:

a central rotor shaft with a longitudinal axis, a plurality of magnetically permeable annular rotor laminations disposed in planes perpendicular to said axis, each of said laminations including a central shaft aperture, a plurality of conductive bar slots spaced apart along the periphery area of said lamination and respectively holding a conductive bar or material therein, a plurality of permanent magnet slots surrounding said central shaft aperture and substantially dividing said lamination into an inner and an outer portion and respectively securing a permanent magnet therein for establishing even magnetic poles on the periphery of said rotor by the magnetic field of said permanent magnets, a plurality of flux barrier slots respectively disposed in areas of said magnetic poles for setting up flux barriers to minimize flux leakage from said permanent magnets, each of said flux barrier slots configured in such a way that it is connected to an end of said magnet slot and, in cooperation with but without connection to said conductive bar slot, form bridge between said inner portion and outer portion of said lamination, said bridge being substantially perpendicular to a radial line extending from the center of the lamination through said flux barrier to the periphery of the lamination, in order to simplify the manufacture and enhance the strength of said rotor lamination so as to provide a high-speed rotor, while minimizing the leakage flux from said permanent magnets.

2. A rotor in accordance with claim 1, wherein said even magnetic poles created by the magnetic field of said permanent magnets can be two poles, four poles or six poles.

3. A rotor in accordance with claim 1, wherein said rotor lamination further has an opening between each said conductive bar slot and the periphery of said lamination for minimizing power loss from said rotating magnetic field generated by said primary windings on the stator.

4. A rotor in accordance with claim 1, wherein said rotor lamination further includes a plurality of a second set of flux barrier slots each of which is connected to another end of one of said magnet slots and extend to form a narrow bridge across a quadrature line in cooperation with the adjacent flux barrier slot for further strengthening said rotor lamination.

5. A rotor in accordance with claim 4, wherein said narrow bridges can be directly formed between two magnet slots without using said second set of flux barrier slots.

6. A rotor in accordance with claim 1 or 4, wherein said flux barrier slots are either filled with a conductive material, such as aluminium, or nothing at all.

7. A rotor in accordance with claim 1, wherein said conductive bar slots are either filled with individual conductive bars or conductive casting material.

8. A rotor in accordance with claim 1, wherein said magnet slots are in rectangular shape for holding rectangular shaped permanent magnets.

9. A rotor in accordance with claim 1, wherein said flux barrier slots are in triangular shape having one side facing one of said conductive bar slots to form a bridge therebetween.

10. A rotor in accordance with claim 1, wherein said bridges are in a discontinuous ring configuration between said bar slots and said barrier slots so that positions of said barrier slots and said magnet slots can be changed or displaced with respect to the central axis during manufacture.

11. A rotor for an AC permanent magnetic synchronous motor having a stator with a primary winding for producing a rotating magnetic field, comprising:

a central rotor shaft with a longitudinal axis, a plurality of magnetically permeable annular laminations disposed in planes perpendicular to said axis, each of said laminations including a central shaft aperture, a plurality of squirrel cage bar slot spaced apart around the periphery area of said lamination and respectively holding a conductive bar or material therein, each of which has an opening toward the outside the minimizing power loss from said rotating magnetic field, a plurality of permanent magnet slots surrounding said central shaft aperture and substantially dividing said lamination into an inner portion and an outer portion and respectively holding a permanent magnet therein for establishing even magnetic poles on the periphery of said rotor by the magnetic field of said magnets, a plurality of flux barrier slots respectively located in areas of said magnetic poles for establishing flux barriers to minimize leakage flux from said magnets, each of which is connected to an end of one of said magnet slots, and extends outwardly to the periphery area of said lamination without connection of any kind to said squirrel cage bar slots to form a bridge between said inner portion and outer portion of said lamination, said bridge being substantially perpendicular to a radial line extending from the center of said lamination through said flux barrier to the periphery area of said laminating to enhance the strength of said lamination and minimize the leakage flux from said permanent magnets.

12. A rotor in accordance with claim 11, wherein the outer end of each said flux barrier slot faces the end of one of said squirrel bar slots, leaving a bridge or a ring configuration therebetween for resisting centrifugal force applied on said outer portion of said lamination during rotation and simplify the manufacture.

13. A rotor in accordance with claim 11, wherein said flux barrier slots are either air slots or filled with a conductive material, such as aluminium.

14. A rotor in accordance with claim 11, wherein said even magnetic poles formed by the magnetic field of said magnets can be two magnetic poles, or four magnetic poles or six magnetic poles.

15. A rotor in accordance with claim 14, wherein each of said laminations further includes a plurality of a second set of flux barrier slots, each of which is connected to the end of one of said magnet slots and extends forward to form a bridge across a quadrature line in cooperation with the adjacent similar flux barrier slot connected to an adjacent magnet slot for further strengthening said lamination.

16. A rotor in accordance with claim 11, wherein each of said flux barrier slots is a triangular shape, with one side facing the end of said squirrel cage bar slot to form a bridge thereunder.

17. A rotor lamination which is used in a permanent magnet rotor, said rotor including a stack of said rotor laminations for a high speed AC permanent magnet synchronous motor, comprising:

a circular central aperture for holding a rotor shaft, a plurality of squirrel cage bar slots spaced apart around the periphery area of said lamination for respectively holding a conductive bar therein, each of said bar slots having an opening facing outside for minimizing power loss from the rotating magnetic field produced by a primary winding on a motor stator, a plurality of permanent magnet slots surrounding said central aperture and substantially dividing said lamination into an inner portion and an outer portion for holding permanent magnets therein which establish even magnetic poles on the periphery of said lamination, a plurality of flux barrier slots respectively located in areas of said magnetic poles for establishing flux barriers to minimize leakage flux from said permanent magnets, each of said flux barrier slots connected to an end of said magnet slot and extending outwardly to the peripheral area of said lamination without connection to any of said squirrel cage bar slots so as to form a bridge or a ring configuration between said inner portion and outer portion of said lamination, said bridge being substantially perpendicular to a radial line extending from the center of said lamination via said flux barrier to the periphery of said lamination, to enhance the strength of said lamination.

18. A rotor lamination in accordance with claim 17, further including a plurality of second set of flux barrier slots, each connected to the end of one of said magnet slots and extending forward to form a bridge across a quadrature line in cooperation with another same flux barrier slot connected to an adjacent magnet slot for further strengthening said lamination.

19. A rotor lamination in accordance with claim 17, wherein the outer ends of said flux barrier slots either face the inner ends of said squirrel cage bar slots or disposed unsymmetrically with respect to the inner ends of said squirrel cage bar slots.

* * * * *